(12) United States Patent
Singh

(10) Patent No.: US 11,269,539 B2
(45) Date of Patent: Mar. 8, 2022

(54) METHODS FOR MANAGING DELETION OF DATA OBJECTS BY UTILIZING COLD STORAGE AND DEVICES THEREOF

(71) Applicant: NetApp, Inc., Sunnyvale, CA (US)

(72) Inventor: Sundeep Singh, Sunnyvale, CA (US)

(73) Assignee: NETAPP, INC., Sunnyvale, CA (US)

(*) Notice: Subject to any disclaimer, the term of this patent is extended or adjusted under 35 U.S.C. 154(b) by 0 days.

(21) Appl. No.: 16/417,095

(22) Filed: May 20, 2019

(65) Prior Publication Data

US 2020/0371704 A1 Nov. 26, 2020

(51) Int. Cl.
*G06F 3/06* (2006.01)
*G06F 12/02* (2006.01)

(52) U.S. Cl.
CPC .......... *G06F 3/0649* (2013.01); *G06F 3/0608* (2013.01); *G06F 3/0638* (2013.01); *G06F 3/0689* (2013.01); *G06F 12/0253* (2013.01)

(58) Field of Classification Search
CPC .... G06F 3/0646; G06F 3/0647; G06F 3/0649; G06F 3/065; G06F 3/0652; G06F 2206/1004; G06F 2206/1012
See application file for complete search history.

(56) References Cited

U.S. PATENT DOCUMENTS

2012/0254865 A1* 10/2012 Saeki ................. G06F 9/45533
718/1
2020/0082015 A1* 3/2020 Watts ................. G06F 16/9024

* cited by examiner

*Primary Examiner* — Yong J Choe
(74) *Attorney, Agent, or Firm* — Troutman Pepper Hamilton Sanders LLP

(57) ABSTRACT

Methods, non-transitory computer readable media, and computing devices that manages deletion of data objects by utilizing cold storage includes identifying unreferenced data objects within a set of identified data objects in a storage device. The identified unreferenced data objects are moved from an active tier portion of the storage device to a cold tier portion of the storage devices. The moved unreferenced data objects in the cold tier portion of the storage device manage based on a lifecycle policy.

18 Claims, 10 Drawing Sheets

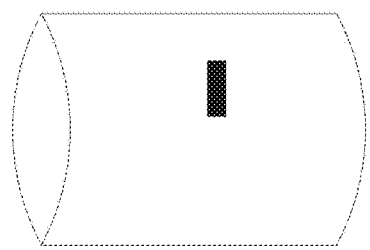
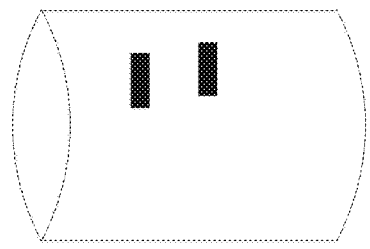
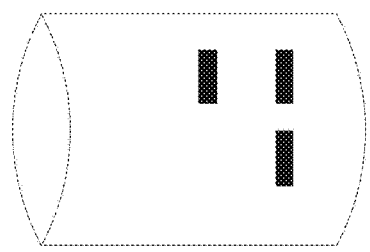
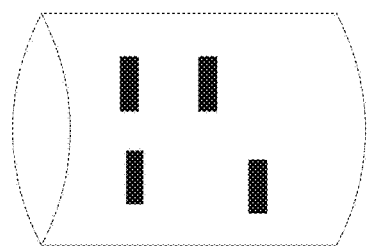
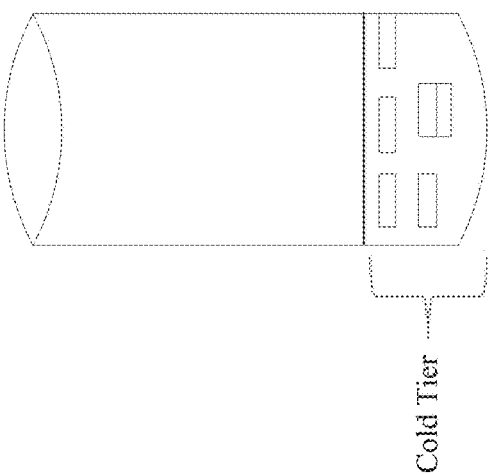
FIG. 8

US 11,269,539 B2

METHODS FOR MANAGING DELETION OF DATA OBJECTS BY UTILIZING COLD STORAGE AND DEVICES THEREOF

FIELD

This technology relates to managing storage system, and particularly, relates to managing deletion of data objects by utilizing cold storage and devices thereof.

BACKGROUND

Businesses worldwide recognize the commercial value of their data and seek reliable, cost-effective ways to store that data on storage devices. Given the rapidly expanding volume of data under management, companies also continue to seek innovative techniques for managing data growth. For instance, companies often implement migration techniques for moving data to lower cost storage over time and data reduction techniques for reducing redundant data, pruning lower priority data, etc.

One existing example of storing data is in a distributed storage system within a cloud network environment that includes a plurality of storage devices (e.g., storage volumes) to provide data storage. The plurality of storage volumes allow clients to share data objects between multiple storage volumes, or between multiple snapshots that are made available locally or backed up to a remote storage device that may or may not be present within the cloud network environment. Due to the nature of this sharing of data objects, a subsequent garbage collection process needs to run to reclaim data objects that are no longer referenced for purposes of data operations (e.g. when older backups expire). During this garbage collection process, some critical data within the backup storage could also be inadvertently deleted. For example, this may be because of a race condition between a new reference to the existing data object and the garbage collection processing identifying the data object as unreferenced. However, when there is a request to read the data, by way of an example, and the date has been inadvertently deleted, an error message is sent back to the requesting client device causing the data operation to fail.

BRIEF DESCRIPTION OF THE DRAWINGS

FIGS. 7-8 are functional block diagrams of an example of managing deletion of unreferenced volumes hosted in a cloud environment by utilizing a cold tier in a data storage device.

DETAILED DESCRIPTION

Figure 1:
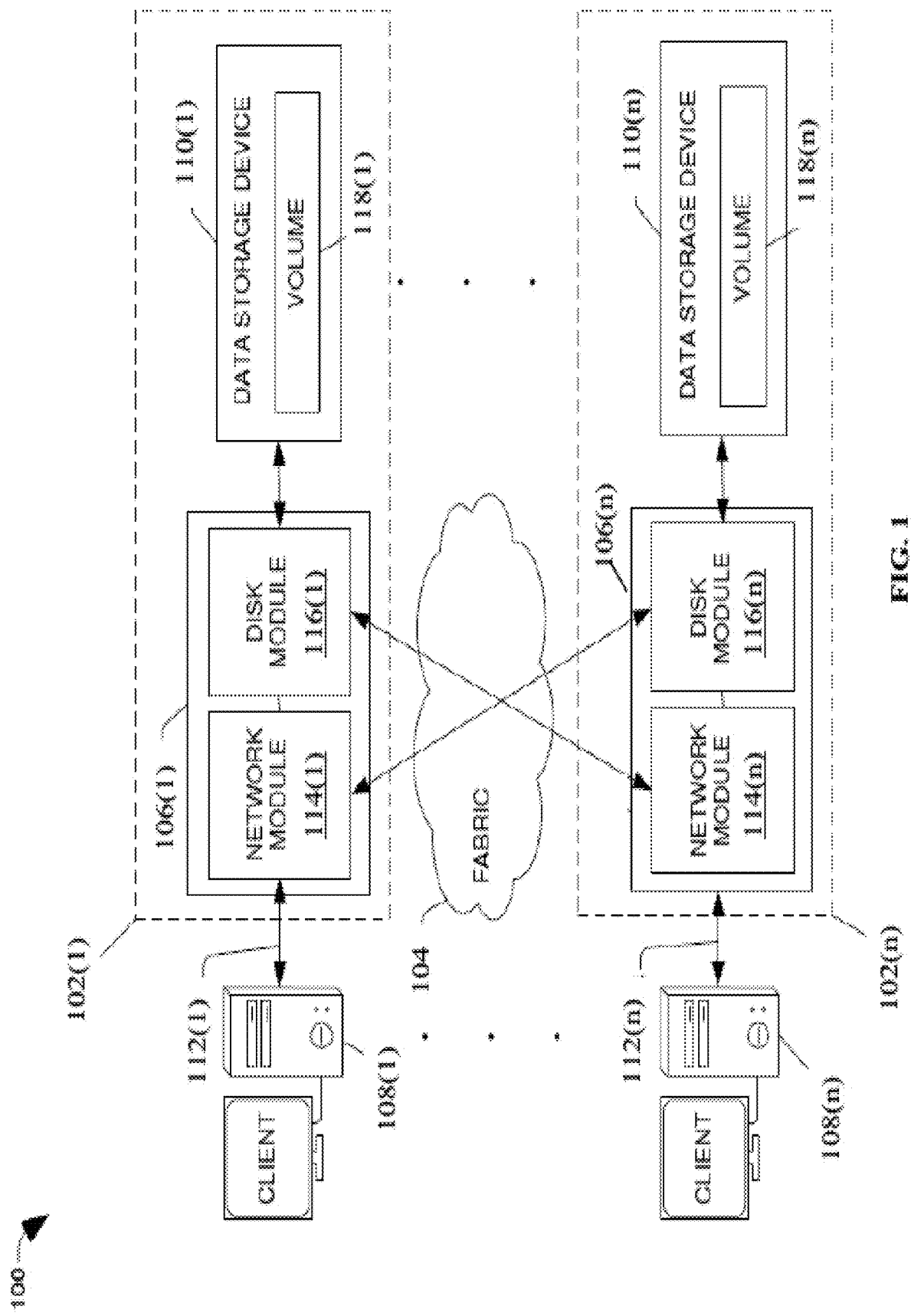
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components etc. therein, such as, node computing devices 106(1)-106(n), for example), although any number of other elements or components can also be included in the clustered network environment 100 in other examples. While FIG. 1 illustrates a clustered network environment, in another example, the data storage apparatuses 102(1)-102(n), the node computing devices 106(1)-106(n), the data storage devices 110(1)-110(n), volumes 118(1)-118(n) can be configured to operate in other types of environments, such as a cloud network environment. This technology provides a number of advantages including methods, non-transitory computer readable media, and devices that allow managing deletion of data objects by utilizing cold tier storage.

In this example, node computing devices 106(1)-106(n) can be primary or local storage controllers or secondary or remote storage controllers that provide client devices 108(1)-108(n), with access to data stored within data storage devices 110(1)-110(n). The data storage apparatuses 102(1)-102(n) and/or node computing device 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices used for storage (e.g., storage servers), and other computers or peripheral devices, are coupled to the respective data storage apparatuses 102(1)-102(n) by storage network connections 112(1)-112(n). Network connections 112(1)-112(n) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(n) may be general-purpose computers running applications, and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage control configured to process I/O commands issued by the client devices 108(1)-108(n)), and the data storage apparatuses 102(1)-102(n) may return results of the request to the client devices 108(1)-108(n) via the storage network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(*n*) may be capable of sending, receiving, and/or forwarding information over a network communications channel, and could comprise any type of device that meets any or all of these criteria.

In an example, the node computing device 106(1) may be located on a first storage site and the node computing device 106(*n*) may be located at a second storage site. The node computing devices 106(1) and 106(*n*) may be configured according to a disaster recovery configuration whereby a surviving node provides switchover access to the storage devices 110(1)-110(*n*) in the event a disaster occurs at a disaster storage site (e.g., the node computing device 106(1) provides client device 112(*n*) with switchover data access to storage devices 110(*n*) in the event a disaster occurs at the second storage site). In other examples, the node computing device 106(*n*) can be configured according to an archival configuration and/or the node computing devices 106(1)-106(*n*) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(*n*) can include various functional components that coordinate to provide a distributed storage architecture. For example, the node computing devices 106(1)-106(*n*) can include network modules 114(1)-114(*n*) and disk modules 116(1)-116(*n*). Network modules 114(1)-114(*n*) can be configured to allow the node computing devices 106(1)-106(*n*) (e.g., network storage controllers) to connect with client devices 108(1)-108(*n*) over the storage network connections 112(1)-112(*n*), for example, allowing the client devices 108(1)-108(*n*) to access data stored in the clustered network environment 100.

Further, the network modules 114(1)-114(*n*) can provide connections with one or more other components through the cluster fabric 104. For example, the network module 114(1) of node computing device 106(1) can access the data storage device 110(*n*) by sending a request via the cluster fabric 104 through the disk module 116(*n*) of node computing device 106(*n*). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(*n*) can be configured to connect data storage devices 110(1)-110(2), such as disks or arrays of disks, SSDs, flash memory, or some other form of data storage, to the node computing devices 106(1)-106(*n*). Often, disk modules 116(1)-116(*n*) communicate with the data storage devices 110(1)-110(*n*) according to the SAN protocol, such as SCSI or FCP, for example, although other protocols can also be used. Thus, as seen from an operating system on node computing devices 106(1)-106(*n*), the data storage devices 110(1)-110(*n*) can appear as locally attached. In this manner, different node computing devices 106(1)-106(*n*), etc. may access data blocks through the operating system, rather than expressly requesting abstract files.

While the clustered network environment 100 illustrates an equal number of network modules 114(1)-114(2) and disk modules 116(1)-116(*n*), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(*n*) and server devices 109(1)-109(*n*) can be networked with the node computing devices 106(1)-106(*n*) in the cluster, over the storage connections 112(1)-112(*n*). As an example, respective client devices 108(1)-108(*n*) that are networked to a cluster may request services (e.g., exchanging of information in the form of data packets) of node computing devices 106(1)-106(*n*) in the cluster, and the node computing devices 106(1)-106(*n*) can return results of the requested services to the client devices 108(1)-108(*n*). In one example, the client devices 108(1)-108(*n*) can exchange information with the network modules 114(1)-114(*n*) residing in the node computing devices 106(1)-106(*n*) (e.g., network hosts) in the data storage apparatuses 102(1)-102(*n*).

In one example, the storage apparatuses 102(1)-102(*n*) host aggregates corresponding to physical local and remote data storage devices, such as local flash or disk storage in the data storage devices 110(1)-110(*n*), for example. One or more of the data storage devices 110(1)-110(*n*) can include mass storage devices, such as disks of a disk array. The disks may comprise any type of mass storage devices, including but not limited to magnetic disk drives, flash memory, and any other similar media adapted to store information, including, for example, data (D) and/or parity (P) information.

The aggregates include volumes 118(1)-118(*n*) in this example, although any number of volumes can be included in the aggregates. The volumes 118(1)-118(*n*) are virtual data stores that define an arrangement of storage and one or more file systems within the clustered network environment 100. Volumes 118(1)-118(*n*) can span a portion of a disk or other storage device, a collection of disks, or portions of disks, for example, and typically define an overall logical arrangement of file storage. In one example volumes 118(1)-118(*n*) can include stored data as one or more files or objects that reside in a hierarchical directory structure within the volumes 118(1)-118(*n*). Volumes 118(1)-118(*n*) are typically configured in formats that may be associated with particular storage systems, and respective volume formats typically comprise features that provide functionality to the volumes 118(1)-118(*n*), such as providing an ability for volumes 118(1)-118(*n*) to form clusters. While FIG. 1 illustrates the volumes 118(1)-118(*n*) to be present within the data storage devices 110(1)-110(*n*), the volumes 118(1)-118(*n*) can be individually present outside the data storage devices 110(1)-110(*n*) and hosted in a cloud environment.

In one example, to facilitate access to data stored on the disks or other structures of the data storage device 110(1)-110(*n*), a file system (e.g., write anywhere file system) may be implemented that logically organizes the information as a hierarchical structure of directories and files. In this example, respective files may be implemented as a set of disk blocks configured to store information, whereas directories may be implemented as specially formatted files in which information about other files and directories are stored.

Data can be stored as files or objects within a physical volume and/or a virtual volume, which can be associated with respective volume identifiers, such as file system identifiers (FSIDs). The physical volumes correspond to at least a portion of physical storage devices, such as the data storage device 110(1)-110(n) (e.g., a Redundant Array of Independent (or Inexpensive) Disks (RAID system)) whose address, addressable space, location, etc. does not change. Typically the location of the physical volumes does not change in that the (range of) address(es) used to access it generally remains constant.

Virtual volumes, in contrast, are stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows them to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual disks, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

In one example, respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
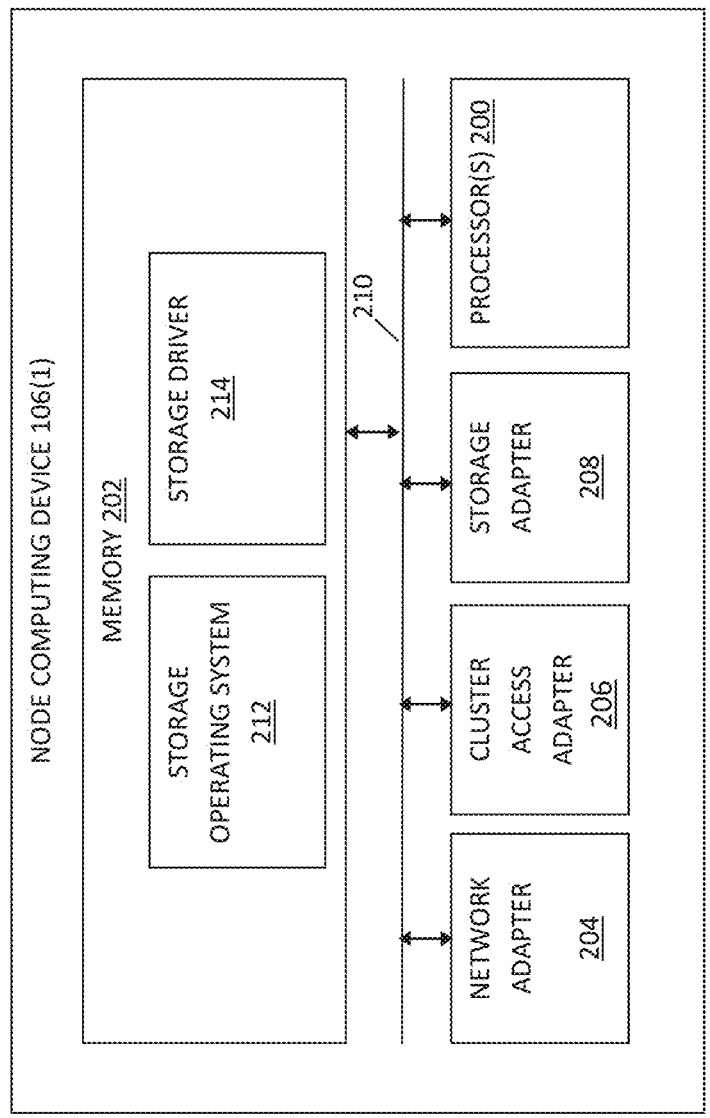
FIG. 2 is a block diagram of an exemplary one of the node computing devices shown in FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a Redundant Array of Independent (or Inexpensive) Disks (RAID) data loss protection and recovery scheme to optimize a reconstruction process of data of a failed disk or drive in an array. In some examples, the node computing device 106(n) is substantially the same in structure and/or operation as node computing device 106(1), although the node computing device 106(n) can include a different structure and/or operation in one or more aspects than the node computing device 106(1) in other examples.

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The storage operating system 212 can also establish one or more file systems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

Accordingly, the examples may be embodied as one or more non-transitory computer readable media having machine or processor-executable instructions stored thereon for one or more aspects of the present technology, as described and illustrated by way of the examples herein, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIG. 3, for example.

The network adapter 204 in this example includes the mechanical, electrical and signaling circuitry needed to connect the node computing device 106(1) to one or more of the client devices 108(1)-108(n) over storage network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n), as described and illustrated in more detail later with reference to FIG. 3.

Figure 3:
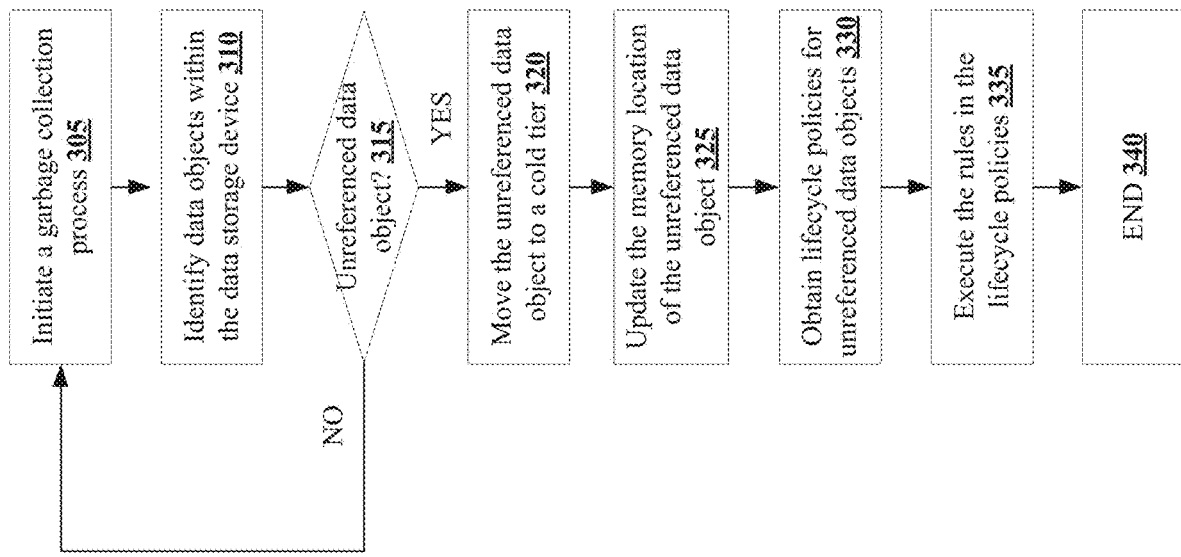
FIG. 3 is a flowchart of an exemplary method for managing deletion of data objects by utilizing cold storage.

Referring to FIG. 3, an exemplary method for managing deletion of data objects by utilizing cold storage. In step 305 in this example, the node computing device 106(1) initiates a garbage collection process in one of the plurality of data storage devices 110(1)-110(n), although the node computing device 106(1) can initiate the garbage collection process on other types of storage devices. In this example, a garbage collection process relates to identifying and deleting unreferenced data objects present within the plurality of data storage devices 110(1)-110(n), although the garbage collection process can include other types or numbers of clean up or other operations that would result in managing storage within any of the storage devices 110(1)-110(n) efficiently.

In step 310 and during the garbage collection process, the node computing device 106(1) identifies all data objects present within the volumes 108(1)-108(n) within the plurality of data storage devices 110(1)-110(n), although the node computing device 106(1) can identify data objects from other storage locations. In another example illustrated in FIGS. 7 and 8, the volumes 118(1)-118(n) can be configured to function in a cloud environment and the garbage collection process of the volumes 118(1)-118(n) will be further illustrated in greater detail below.

Figure 5:
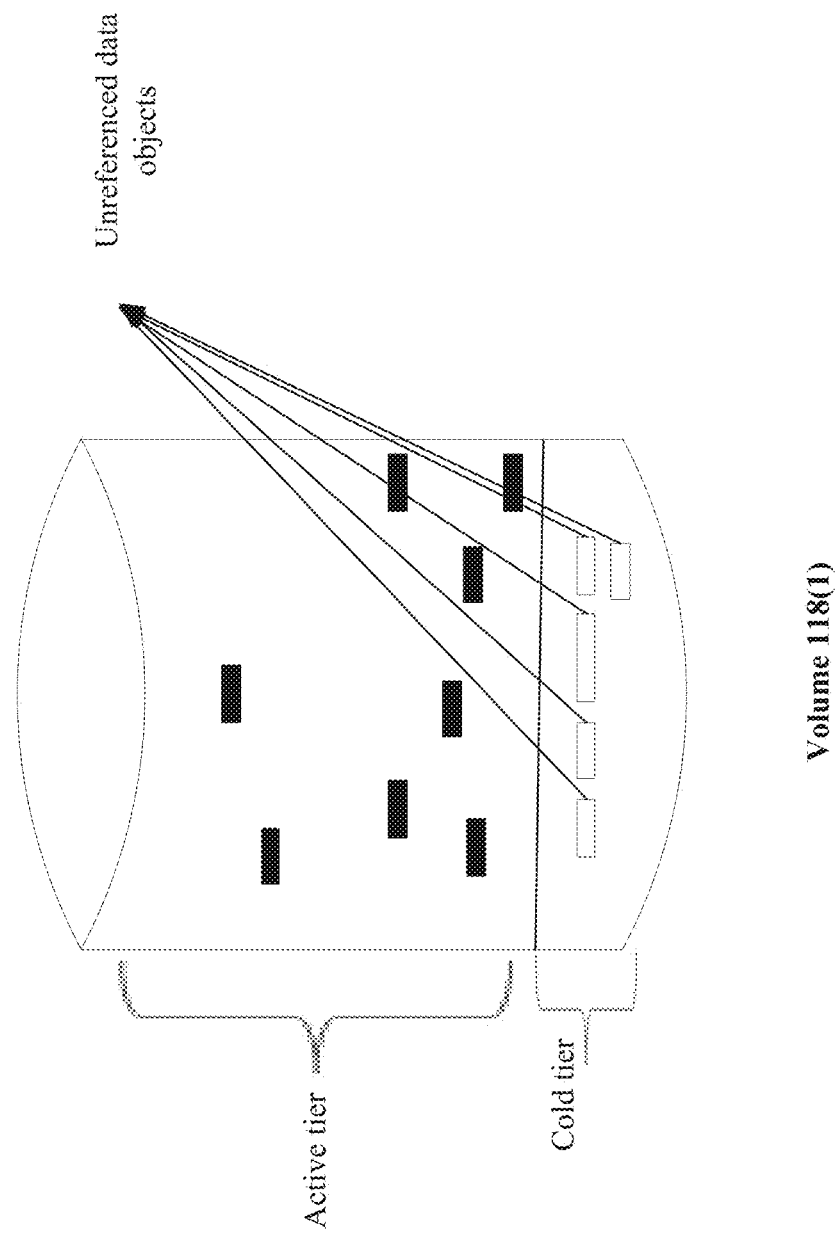

In step 315 and during the garbage collection process, the node computing device 106(1) determines if there are one or more data objects that are currently unreferenced in the identified data objects present the plurality of data storage devices 110(1)-110(n), although the node computing device 106(1) can use other techniques to determine currently unreferenced data objects within the volumes 118(1)-118(n). In this example, unreferenced data objects relates to data objects within an active tier of any of the data storage devices 110(1)-110(n) that are currently not being used or referenced by other volumes, snapshots, or backups to assist the client devices 108(1)-108(n) with data operations. Further in this example, referenced data objects relates to data objects within the active tier that are currently being used or referenced by other volumes 118(1)-118(n), snapshots, or backups. Additionally, in this example, each of the volumes 118(1)-118(n) are portioned into an active tier and a cold tier, although the volumes 118(1)-118(n) can have other types of and numbers of portions or other partitions. In this example, the active tier of the data storage device includes data objects that are currently or actively being referenced for the purpose of data operations and the cold tier includes data objects that are unreferenced or not actively used for the purpose of data operations as illustrated in FIG. 5. By way of example, the node computing device 106(1) looks at the metadata associated with the each of the data object to determine if the data object is being referenced or unreferenced, although the node computing device 106(1) can use other types of techniques to determine if a data object is currently being referenced. Alternatively, in another example, the node computing device 106(1) identifies data objects that are unreferenced by other volumes, snapshots, or backups at least for a set time period. In yet another example, the node computing device 106(1) can determine if a particular type of data object is unreferenced for at least a time period. Accordingly, in step 315 when the node computing device 106(1) determines that there are no unreferenced data objects or no unreferenced data objects of a particular type, then the node computing device 106(1) determines the current garbage collection process is complete and the No branch is taken back to step 305 to initiate another garbage collection process at the next designated time or interval. However, if in step 315 the node computing device 106(1) determines there are one or more unreferenced data objects or one or more unreferenced data objects of a particular type in another example, then the Yes branch is taken to step 320. Additionally in other examples illustrated in FIGS. 7 and 8, the node computing device 106(1) performs the above illustrated step to identify unreferenced data objects in the volumes 118(1)-118(5) configured to operate in a cloud environment.

Figure 4:
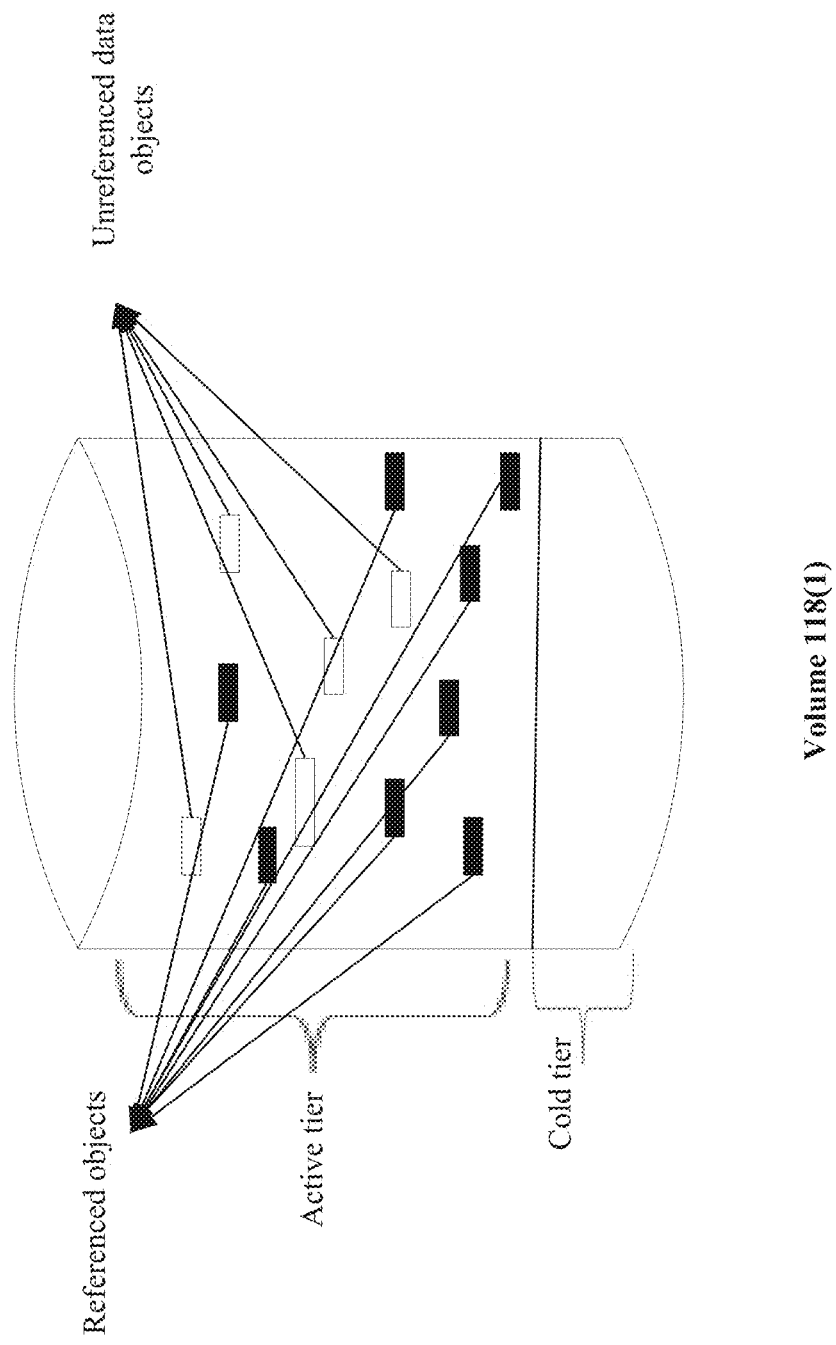
FIGS. 4-6 are functional block diagrams of an example of managing deletion of unreferenced data objects by utilizing a cold tier in a data storage device.
Figure 7:
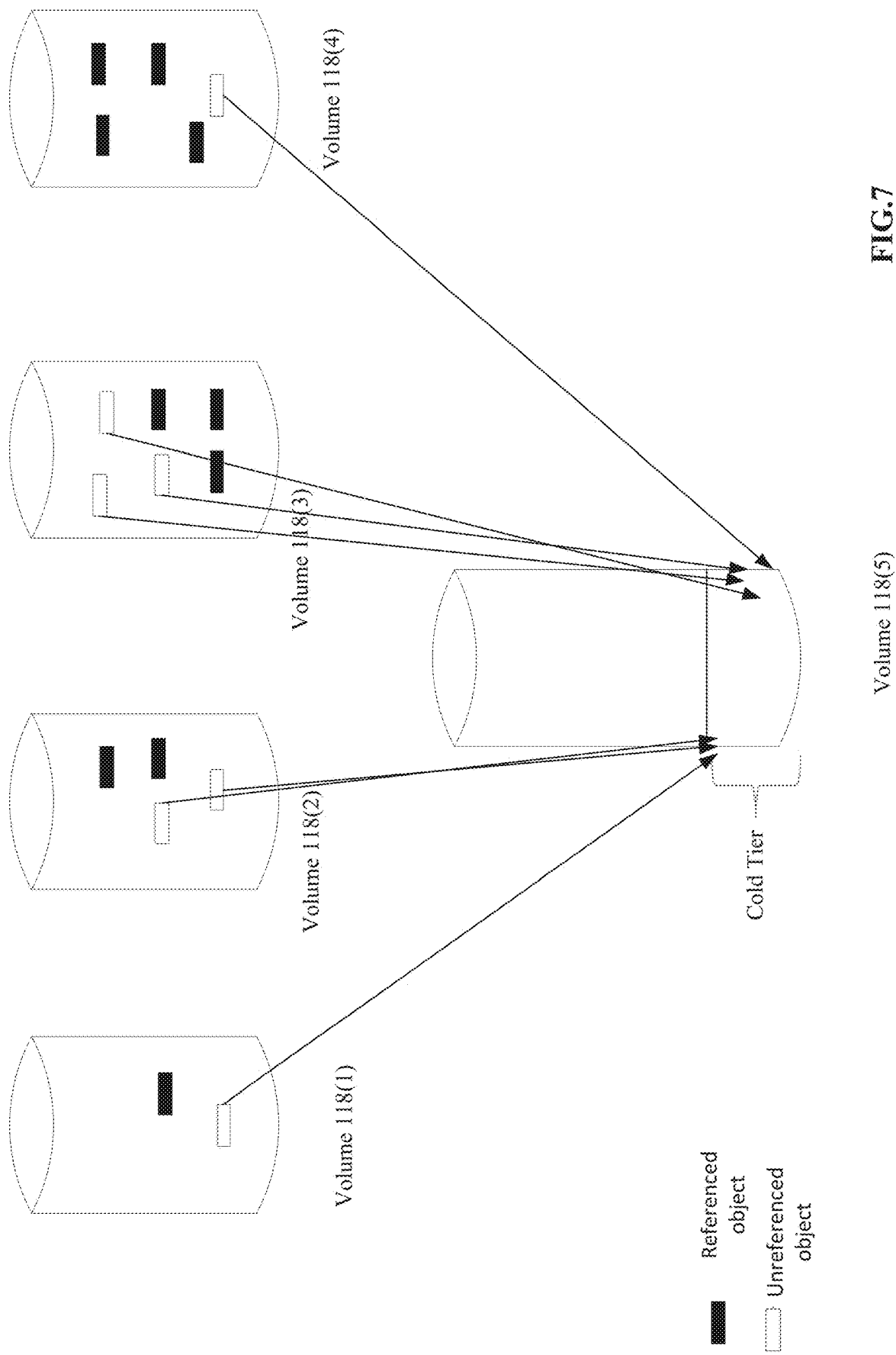

In step 320, the node computing device 106(1) moves the identified unreferenced data objects shown in the active tier in FIG. 4 to the corresponding cold tier portion of each of the volumes 118(1)-118(n) as illustrated in FIG. 5. Alternatively in another example, the identified unreferenced data objects can be moved to a cold tier portion of a storage device that is shared by multiple volumes as illustrated in FIGS. 7 and 8. By moving the unreferenced data objects into the cold tier portion of each of the volumes 118(1)-118(n) instead of deleting the data objects, the disclosed technology is able to prevent race condition and also more effectively manages the storage space within the active tier portion of the volumes 118(1)-118(n).

In step 325, the node computing device 106(1) updates the storage location of the unreferenced data objects in a storage location index table to include the address of the unreferenced data object residing in the cold tier of the data storage device. By updating the address of the unreferenced data object, the node computing device 106(1) is able to quickly identify exact storage location of the unreferenced data object should there be a request to reference the unreferenced data object. Alternatively in another example, the node computing device 106(1) can use a unique identifier to identify the exact location of the unreferenced data objects. By way of example, the unique identifier for the data object could be a hash value of its contents, in which case the node computing device 106(1) would use the hash value corresponding to the data object in the cold tier to perform the lookup.

Figure 9:
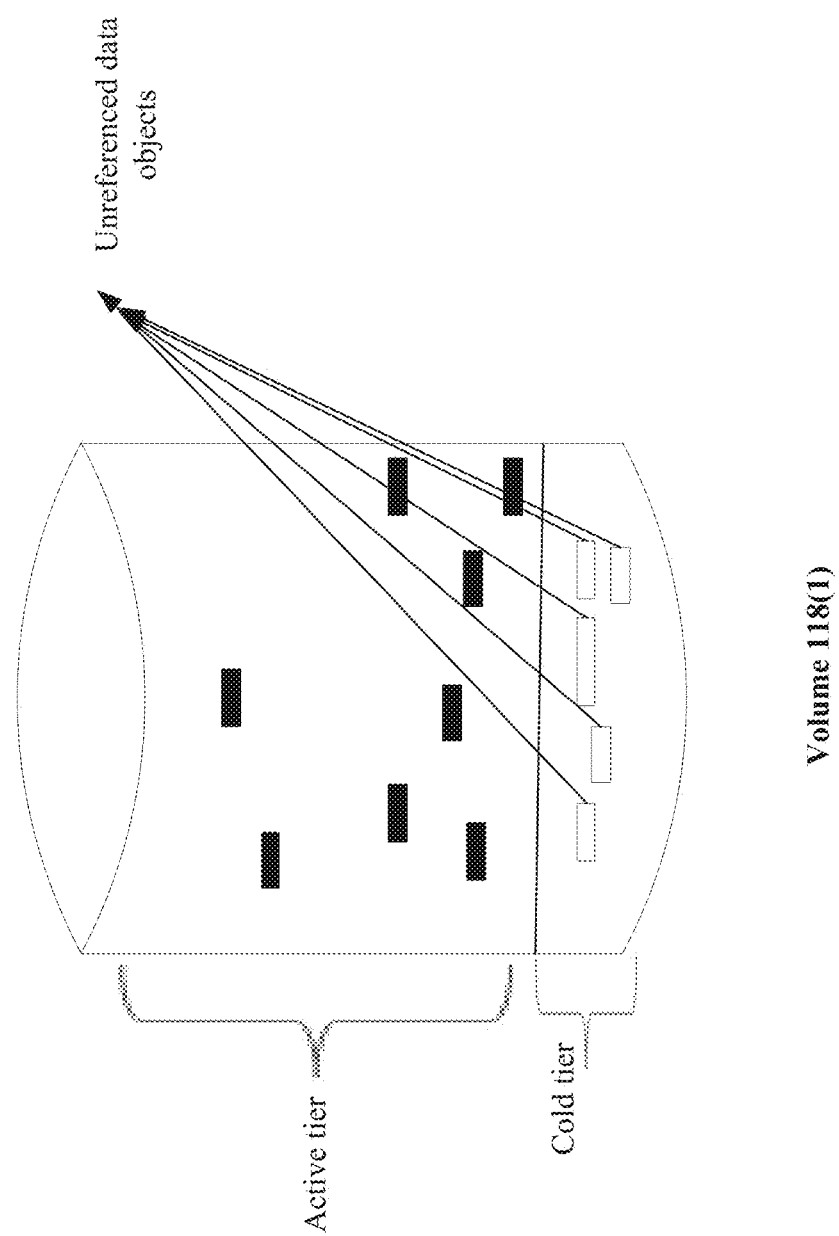
FIGS. 9-10 are functional block diagrams of an unreferenced data object recovered from the cold tier and moved an active tier of a data storage device as a referenced data.
Figure 10:
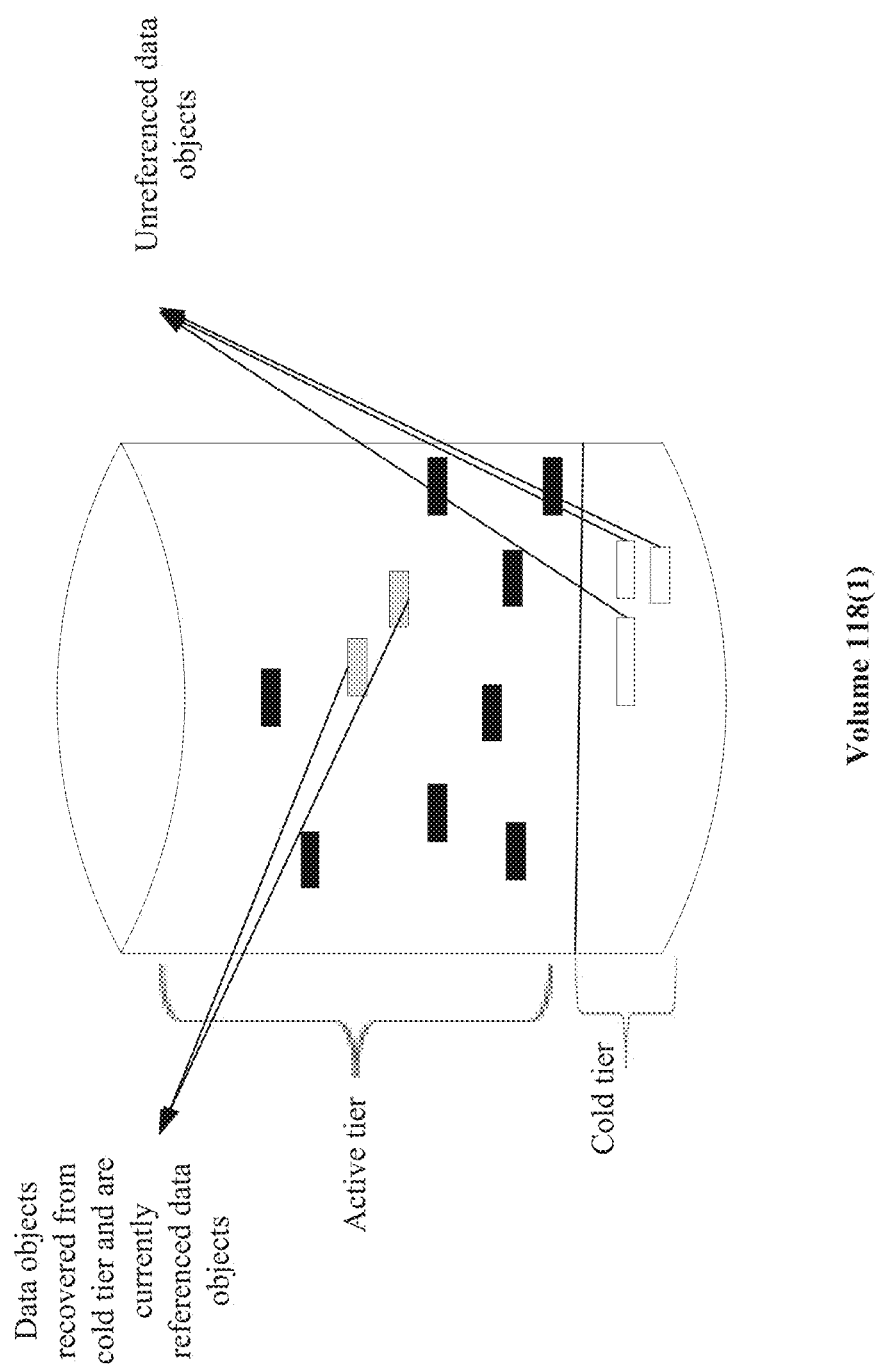

In step 330, the node computing device 106(1) obtains one or more lifecycle policies or otherwise called storage policies associated with the unreferenced data objects in the cold tier. In this example, the lifecycle policies include one or more rules or other executable instructions associated with managing the unreferenced data objects within the cold tier. By way of example, the lifecycle policy can include a rule relating to deleting the unreferenced data object after a set or stored time period has expired. Alternatively, the lifecycle policy can include a rule associated with moving the unreferenced data object to a different data storage device, active tier of the same storage device, or to a cold tier of a different data storage device based on the available storage in the volumes 118(1)-118(n). In another example, the lifecycle policy can include a rule relating to deletion of a specific type of an unreferenced data object after a set or stored time period has expired. In yet another example, the lifecycle policy can include a rule relating to moving a specific type of an unreferenced data object to a cold tier of either the shared storage device or the corresponding storage device. By way of an example, FIGS. 9 and 10 illustrates an example of moving the unreferenced data object from a cold tier to an active tier. In this example, the node computing device 106(1) during the garbage collection process identifies data objects that are unreferenced and moves the unreferenced data objects to the cold tier of the storage device as illustrated in FIG. 9. However, prior to completing the current cycle of the garbage collection, if the node computing device 106(1) determines that the data object that was initially identified as unreferenced is actually currently being referenced by another data object, volume or snapshot, then the node computing device 106(1) moves the data object back to the active tier as illustrated in FIG. 10. By moving the data object back to the active tier, the disclosed technology is able to provide better quality of service to the client devices.

Figure 6:
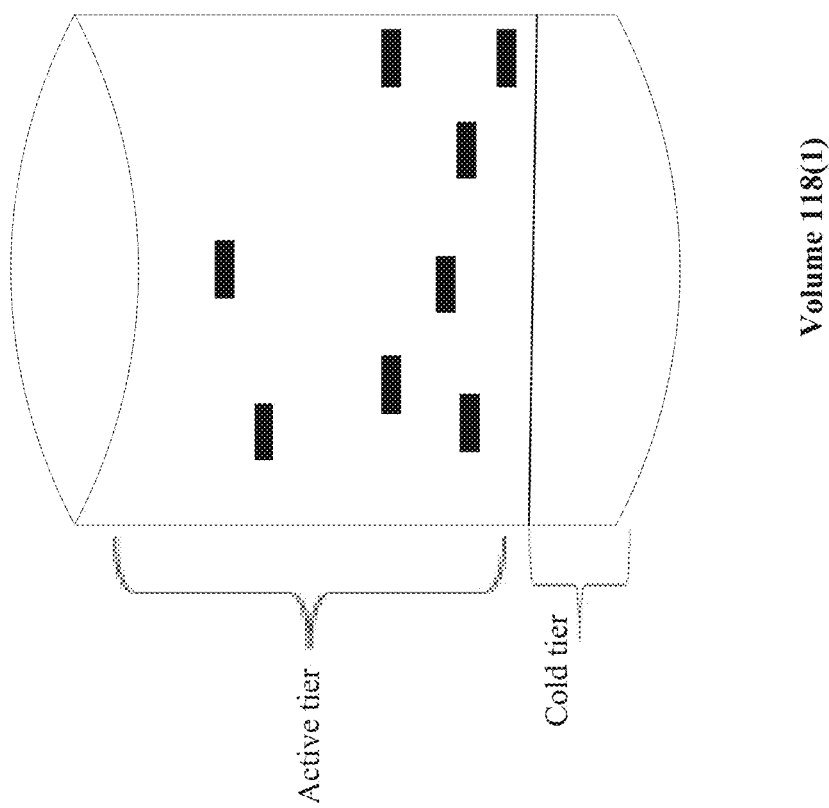

In step 335, the node computing device 106(1) executes the rules included in the obtained one or more lifecycle policies. In this example, the time period that needs to expire before selectively deleting the unreferenced data object from the cold tier can be set such that the unreferenced data object can be deleted after initiating a next garbage collection cycle. By delaying the deletion of the unreferenced data object until initiating the next garbage collection cycle, the disclosed technology is able to move the unreferenced data object back to the active tier if there is a request to access or reference to the unreferenced data object. By way of an example, FIG. 6 illustrates the selectively deleted unreferenced data from the cold tier of the storage device after the initiation of the next garbage collection cycle. The exemplary method ends at step 340.

Accordingly, as illustrated and described by way of the examples herein, this technology provides a number of advantages including providing methods, non-transitory computer readable media and devices for managing more efficient use of storage by identifying and removing unreferenced data objects from active storage to increase efficiency and utilizing cold storage for recovery of unreferenced data objects for a period time set by a storage policy before deletion to provide enhanced backup. Using the above illustrated examples, the disclosed technology is able to effectively utilize storage in the storage devices or volumes by selectively deleting unreferenced data objects from the storage devices or the volumes provide the client devices with a faster response to the request to access the data object. Additionally, the disclosed technology is able to efficiently manage the storage space in the active tier of the volume or the storage device by moving the unreferenced data objects to the cold tier.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method comprising:
identifying, by a computing device, unreferenced data objects within a set of identified data objects within a volume of a storage device;
moving, by the computing device, the identified unreferenced data objects from an active tier portion of the volume within the storage device to a cold tier portion of the volume in the storage device, wherein the identified unreferenced data objects are data objects not referenced by another volume within the storage device and moving from the active tier portion to the cold tier portion avoids a race condition; and
managing, by the computing device, the moved unreferenced data objects in the cold tier portion of the volume within the storage device based on a lifecycle policy associated with the moved unreferenced data objects in the cold tier portion.

2. The method as set forth in claim 1 wherein the lifecycle policy comprises a first rule to selectively delete one or more of the unreferenced data objects from the cold tier portion of the storage device based on one or more conditions after expiration of a set time period associated.

3. The method as set forth in claim 1 wherein the lifecycle policy comprises a second rule to move the unreferenced data objects, back to the active tier portion of the storage devices upon receiving a data object referencing request for the unreferenced data objects.

4. The method as set forth in claim 1 wherein the identified unreferenced data objects are moved from storage volumes to a shared cold tier portion of a shared storage device.

5. The method as set forth in claim 1 further comprising, updating, by the computing device, storage location data associated with the unreferenced data objects after moving the identified unreferenced data objects to the cold tier portion of the storage device.

6. The method as set forth in claim 1 wherein the lifecycle policy comprises a third rule to selectively delete a specific type of one or more of the unreferenced data objects from the cold tier portion of the storage device.

7. A non-transitory machine readable medium having stored thereon instructions for managing deletion of cloud objects by utilizing cold storage comprising machine executable code which when executed by at least one machine causes the machine to:
identify unreferenced data objects within a set of identified data objects within a volume of a storage device;
move the identified unreferenced data objects from an active tier portion of the volume within the storage device to a cold tier portion of the volume in the storage device, wherein the identified unreferenced data objects are data objects not referenced by another volume within the storage device and moving from the active tier portion to the cold tier portion avoids a race condition; and
manage the moved unreferenced data objects in the cold tier portion of the volume within the storage device based on a lifecycle policy associated with the moved unreferenced data objects in the cold tier portion.

8. The medium as set forth in claim 7 wherein the lifecycle policy comprises a first rule to selectively delete one or more of the unreferenced data objects from the cold tier portion of the storage device based on one or more conditions after expiration of a set time period associated.

9. The medium as set forth in claim 7 wherein the lifecycle policy comprises a second rule to move the unreferenced data objects, back to the active tier portion of the storage devices upon receiving a data object referencing request for the unreferenced data objects.

10. The medium as set forth in claim 7 wherein the identified unreferenced data objects are moved from storage volumes to a shared cold tier portion of a shared storage device.

11. The medium as set forth in claim 7 further comprising, updating storage location data associated with the unreferenced data objects after moving the identified unreferenced data objects to the cold tier portion of the storage device.

12. The medium as set forth in claim 7 wherein the lifecycle policy comprises a third rule to selectively delete a specific type of one or more of the unreferenced data objects from the cold tier portion of the storage device.

13. A computing device, comprising:
a memory containing machine readable medium comprising machine executable code having stored thereon instructions for handling storage element failures to reduce storage device failure dates; and
a processor coupled to the memory, the processor configured to execute the machine executable code to cause the processor to:
identify unreferenced data objects within a set of identified data objects within a volume of a storage device;
move the identified unreferenced data objects from an active tier portion of the volume within the storage device to a cold tier portion of the volume in the storage device, wherein the identified unreferenced data objects are data objects not referenced by another volume within the storage device and moving from the active tier portion to the cold tier portion avoids a race condition; and
manage the moved unreferenced data objects in the cold tier portion of the volume within the storage device based on a lifecycle policy associated with the moved unreferenced data objects in the cold tier portion.

14. The device as set forth in claim 13 wherein the lifecycle policy comprises a first rule to selectively delete one or more of the unreferenced data objects from the cold tier portion of the storage device based on one or more conditions after expiration of a set time period associated.

15. The device as set forth in claim 13 wherein the lifecycle policy comprises a second rule to move the unreferenced data objects, back to the active tier portion of the storage devices upon receiving a data object referencing request for the unreferenced data objects.

16. The device as set forth in claim 13 wherein the identified unreferenced data objects are moved from storage volumes to a shared cold tier portion of a shared storage device.

17. The device as set forth in claim 13 wherein the processor is further configured to execute the machine executable code to further cause the processor to update storage location data associated with the unreferenced data objects after moving the identified unreferenced data objects to the cold tier portion of the storage device.

18. The device as set forth in claim 13 wherein the lifecycle policy comprises a third rule to selectively delete a specific type of one or more of the unreferenced data objects from the cold tier portion of the storage device.

\* \* \* \* \*